United States Patent

[11] 3,619,446

| [72] | Inventor | Jan P. Nauta<br>West Hartford, Conn. |
|---|---|---|
| [21] | Appl. No. | 707,005 |
| [22] | Filed | Feb. 2, 1968 |
| [45] | Patented | Nov. 9, 1971 |
| [73] | Assignee | Rowland Products Incorporated<br>Kensington, Conn. |

[54] METHOD FOR MAKING RESILIENTLY FACED ROLLS
13 Claims, 5 Drawing Figs.

[52] U.S. Cl.................................................. 264/102,
18/2 C, 18/10, 18/36, 18/DIG. 29, 18/DIG. 44,
29/148.4 D, 29/450, 101/28, 249/97, 264/135,
264/226, 264/284, 264/312, 264/313, 264/335,
264/338, 264/DIG. 68
[51] Int. Cl. ..................................................... B23p 11/02,
B29c 1/02, B29c 1/04, B29c 7/00, B44b 5/02
[50] Field of Search........................................... 264/1, 219,
220, 313, 225–227, 101, 102, 135, 335, 269, 342,
264, 312, 338, 284

[56] References Cited
UNITED STATES PATENTS

| 445,932 | 2/1891 | Murnane et al............... | 264/220 X |
| 3,056,166 | 10/1962 | Weinberg...................... | 264/1 X |
| 3,189,670 | 6/1965 | Robison ....................... | 264/227 |
| 3,320,344 | 5/1967 | Slipp ............................ | 264/219 |
| 3,337,659 | 8/1967 | Grandperret................. | 264/1 |
| 3,356,242 | 12/1967 | Cleereman ................... | 264/310 X |
| 3,387,351 | 6/1968 | Roosen........................ | 264/219 X |
| 3,222,443 | 12/1965 | Dames, Jr. et al. ........... | 264/313 |

Primary Examiner—Robert F. White
Assistant Examiner—J. H. Silbaugh
Attorney—Peter L. Costas ABSTRACT: There is disclosed a method for making rolls to produce a controlled surface finish upon synthetic thermoplastic sheet material wherein a female mold impression is produced from a male mold member having the desired peripheral surface configuration intended for the roll to be used in the process. After the female mold impression has been made by use of a curable synthetic plastic resin, a support member is inserted into the female mold and a synthetic plastic resin is cast on the surface thereof so as to form a male impression upon its peripheral surface conforming to that of the female mold. The synthetic plastic is then cured and the resultant roll is used as at least one of a pair of rolls operating upon the surface of the heated thermoplastic sheet material so as to impress its surface characteristics thereupon.

Although the surface of the roll may be mirror-polished in accordance with the disclosed procedure, generally the roll produced will have a multiplicity of cavities or protuberances thereon for embossing purposes.

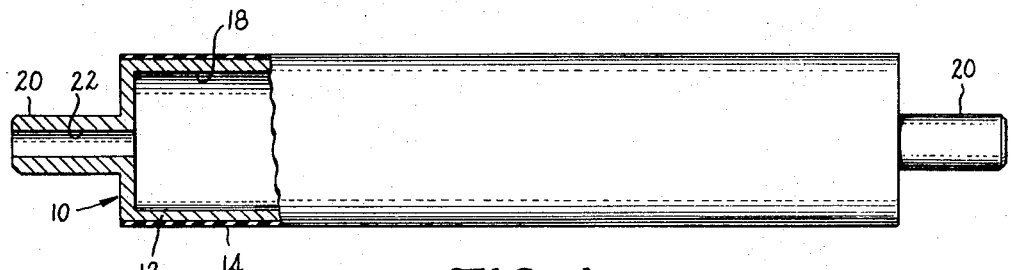
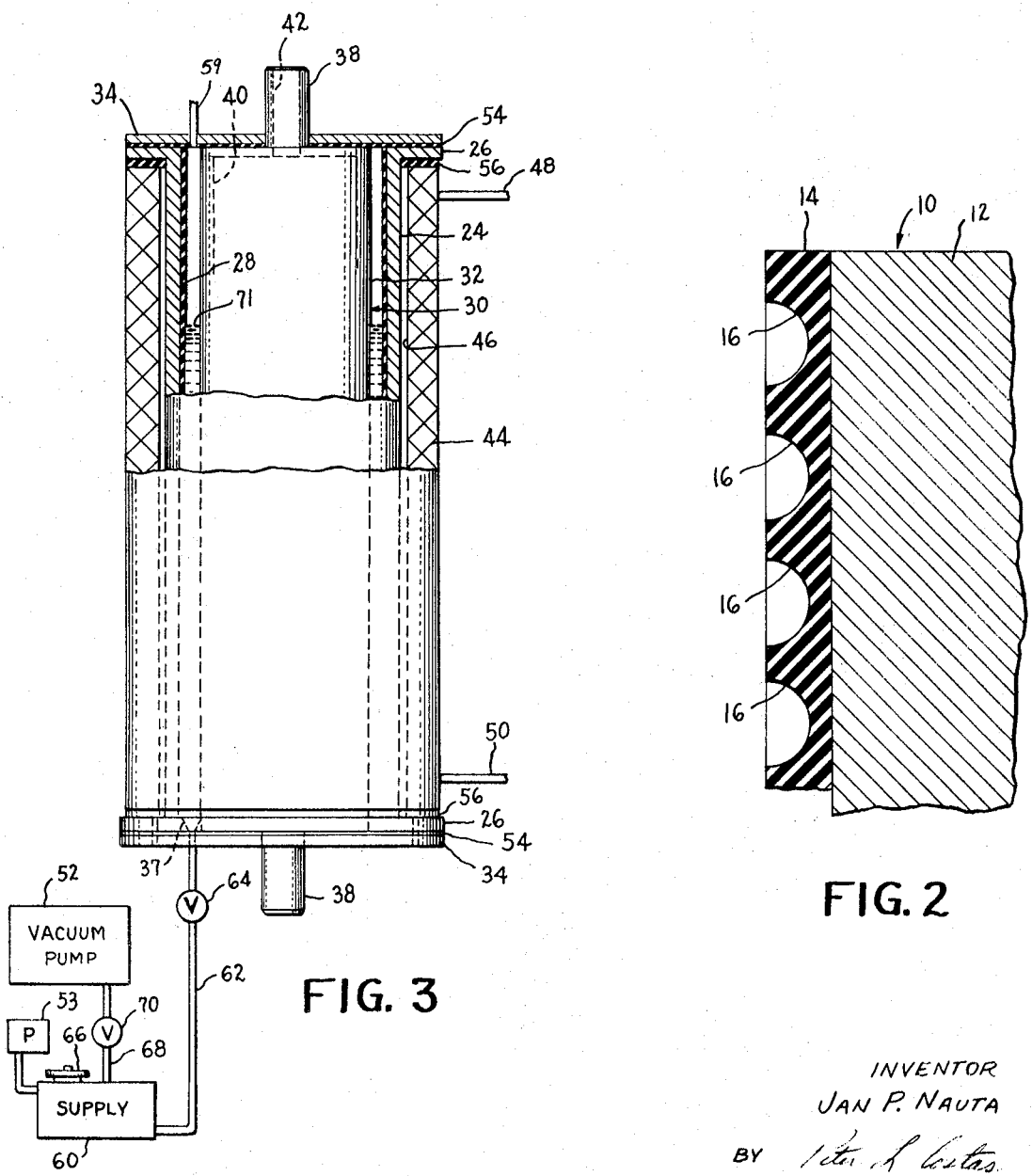

INVENTOR
JAN P. NAUTA
BY
ATTORNEY

METHOD FOR MAKING RESILIENTLY FACED ROLLS

BACKGROUND OF THE INVENTION

In the extrusion and calendaring of synthetic thermoplastic sheet materials, it is frequently desirable to use at least one roll which has a relatively resilient surface in order to maintain relatively uniform pressures across the width of the sheet material and to compensate for variation in the thickness of the sheet material passing into the nip between the pair of cooperating rolls. In some instances two resiliently faced rolls may be employed although generally most applications use one relatively resilient roll with one rigid roll such as a conventional steel roll.

Such a combination involving at least one resiliently faced roll is employed not only for embossing wherein portions of the surface of the sheet material are actually to be displaced but also in polishing wherein the surface is to be rendered as mirror-smooth as possible. In embossing, the displacement and deviation from a mirror-smooth surface may be so minute as to merely provide a uniform matte finish. In operating at relatively high speeds, the need to establish uniformity of pressure and compensate for deviation in the thickness of the sheet material becomes even greater.

There have been a number of proposals for making resiliently faced rolls. In one approach, the surface of the resilient material upon the roll may be polished, ground or otherwise mechanically or chemically treated to achieve the desired surface although not with the ultimate degree of perfection. In another approach, the surface may be developed by casting a synthetic resin coating against a female mold surface but there are very significant problems in obtaining optimum uniformity in the surface thus produced and avoiding flow lines, mold parting lines, etc.

It is an object of the present invention to provide a novel and highly effective method for producing rolls having a relatively resilient surface of the desired characteristic for finishing the surface of synthetic thermoplastic sheet material. It is also an object to provide such a method which is relatively economical and adaptable for use in providing a wide variety of surface finishes.

A specific object id to provide such a method for producing embossing rolls having a relatively durable surface coating with the desired embossing pattern therein.

Another object is to provide a method for embossing synthetic thermoplastic sheet material by use of such rolls either singly in combination with a steel or like roll or in pairs.

Still another object is to provide a method for making such resiliently faced rolls which is simple and inexpensive and which may be practiced in apparatus that is simple and relatively trouble-free to operate.

A further object is to provide a method for making improved embossing rolls having a resilient surface of uniform characteristics throughout and which are capable of long-lived operation in the finishing of synthetic thermoplastic sheet material.

SUMMARY OF THE INVENTION

It has now been found that the foregoing and related objects can be readily attained by a method in which there is initially provided a mold having an aperture therein and in which there is supported coaxially a generally cylindrical male mold member having a peripheral surface for producing the desired complimentary surface on synthetic thermoplastic sheet material. The male mold member is of lesser diameter than the wall of the mold defining the aperture so as to provide a spacing therebetween, and a fluid synthetic plastic resin is introduced into the space between the wall of the male mold member and the wall of the mold so as to fill such spacing. The resin is then subjected to conditions sufficient for setting thereof and to bond it to the wall of the mold defining the aperture. The resin is a relatively durable one and the coating upon the mold closely conforms to the surface of the male mold member to provide a female impression thereof.

The male mold member is then withdrawn from the bonded mold and synthetic plastic resin impression which thus provides a generally cylindrical female mold impression for the resultant cavity. A support member is positioned coaxially in the cavity defined by the female mold impression and is of lesser width than the inside diameter of the impression so as to provide a space therebetween into which is introduced a fluid synthetic plastic resin in an amount sufficient to fill the space. This resin is also one which demonstrates a high degree of durability and resiliency upon setting thereof and is subjected to conditions sufficient to set it and produce bonding thereof to the support member as a resilient layer thereon which conforms closely to the surface of the female mold impression to provide a male impression thereof. This mold assembly is then withdrawn from the mold and female impression to provide a cylindrical roll body having a relatively resilient surface conforming substantially to that of the male mold member which was used to generate the female mold impression.

The rolls which are thus produced may be used in combination with a metal roll or they may be used in pairs so as to impart the desired surface finish upon one or both surfaces of synthetic thermoplastic sheet material passing into the nip therebetween. As will be discussed in detail hereinafter, the surface finish of the roll may be one which is highly polished or mirror-smooth to provide a polished surface upon the sheet material or most usually it will be one in which there are a multiplicity of protuberances or cavities about the surface thereof so as to emboss the surface of the sheet material. The roll will generally be hollow-cored so as to permit the passage of heat exchange fluid therethrough both to facilitate the process of manufacture thereof and to facilitate the process of surface finishing of the sheet material as will be explained in detail hereinafter.

Generally, the apparatus employed will include a mold having an aperture therein which may be comprised of a cylindrical tubular member. A removable cover is provided on at least one end thereof and preferably on both ends thereof with apertures therein coaxial with the aperture of the mold for receiving the shaft elements on a support member inserted thereinto. The wall of the mold defining the aperture has a coating of resiliently deformable and relatively durable synthetic plastic resin with a surface which is complimentary to the desired surface for the roll to be produced thereby. Inlet means is provided on the mold for introducing a fluid synthetic plastic coating thereto. A supply vessel for fluid synthetic plastic resin is connected to the inlet by conduit means, and heat exchange means are provided on the mold for varying the temperature of the coating of synthetic plastic resin and fluid synthetic resin introduced into the mold aperture during operation of the apparatus. A support member for producing the roll is mounted in the mold aperture and has a body portion of lesser width than the inside diameter of the coating on the mold wall so as to provide a spacing therebetween. Shaft elements on the ends thereof extend outwardly through the apertures in the mold covers.

BRIEF DESCRIPTION OF THE DRAWINGS

FIG. 1 is a front elevational view of a roll embodying the present invention with a portion thereof in section to reveal internal construction;

FIG. 2 is a fragmentary sectional view thereof to a greatly enlarged scale;

FIG. 3 is a semidiagrammatic representation of apparatus employed in the present invention with portions thereof broken away to reveal internal construction and showing fluid synthetic plastic material being introduced thereinto during one stage of the operation of the present invention;

DETAILED DESCRIPTION OF THE ILLUSTRATED EMBODIMENTS

Figure 4:
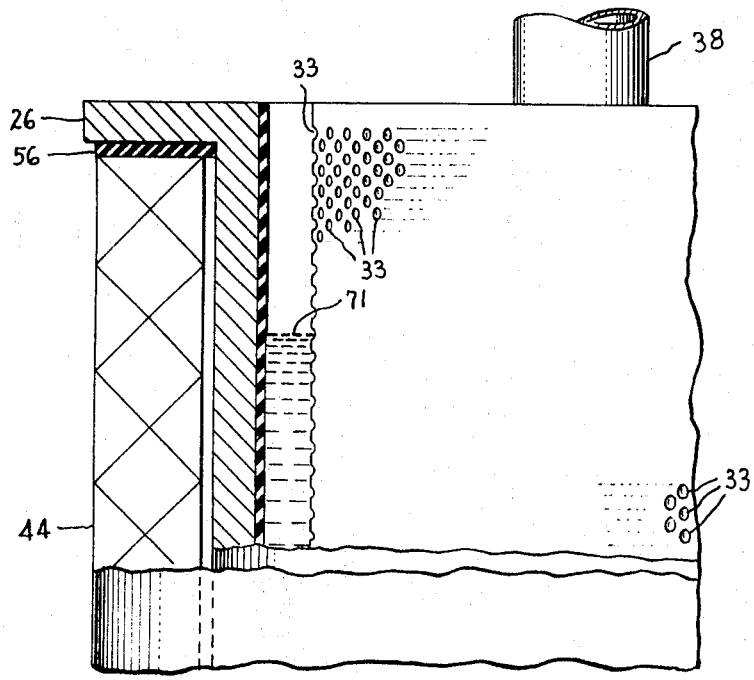
FIG. 4 is a fragmentary semidiagrammatic view similar to FIG. 3 to a greatly enlarged scale showing the cavities in the male mold or roll and the primer coating in greatly exaggerated dimension and with the top cover and gasket removed.

Turning first to FIGS. 1 and 2 of the attached drawings, therein illustrated is an embossing roll for use in the present invention consisting of a metal support member generally designated by the numeral 10 and having about its cylindrical body portion 12 a coating of relatively resiliently deformable material generally designated by the numeral 14 with a multiplicity of closely spaced, generally spheroidal depressions 16 therein. As best seen in FIG. 1, the cylindrical body portion 12 of the support member 10 is hollow providing a chamber 18 therein for receiving a heat exchange fluid, and the shaft elements 20 extending coaxially outwardly from the ends thereof for mounting in a roll stand (not shown) have passages 22 extending therethrough communicating with the chamber 18 for passage of the fluid therethrough.

Figure 5:
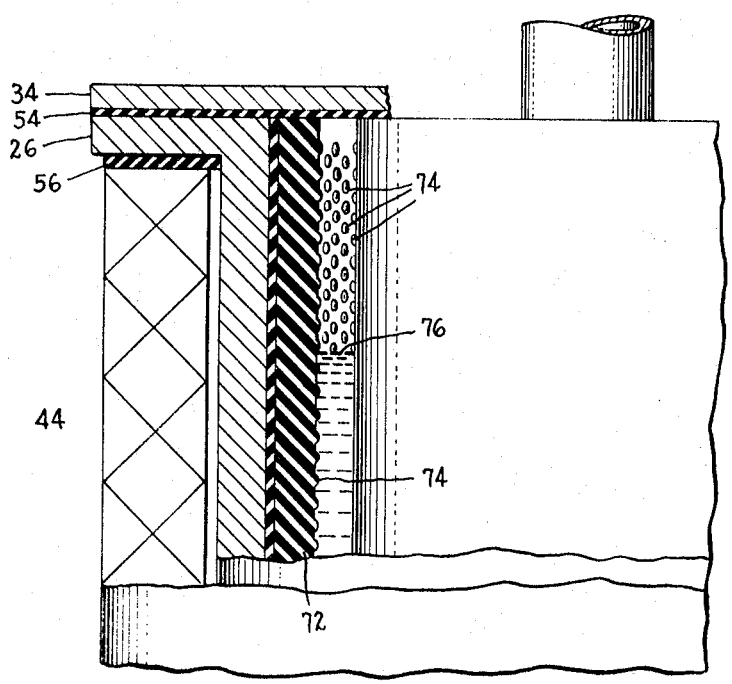
FIG. 5 is a view similar to FIG. 4 showing the apparatus during the casting of the resilient surface upon a support member with the primer coating and the protuberances on the female mold impression shown to a greatly enlarged scale.

Turning now to FIGS. 3-5, therein is semidiagrammatically illustrated apparatus and the method for making the rolls used in the present invention. In FIG. 3, there is shown a suitable mold assembly with a cylindrical mold 24 having radially outwardly extending flanges 26 at the ends thereof and providing a cylindrical aperture 28 therein. A male mold member generally designated by the numeral 30 is supported coaxially within the mold aperture 28 and has a body portion 32 of lesser diameter than the diameter of the wall of the mold defining the aperture 28 so as to provide an annular spacing thereabout. Top and bottom covers 34, 36 close the mold aperture 28 and are secured to the mold flanges 26 by fasteners (not shown) seated in cooperating apertures therein. The bottom cover 36 has a feed aperture 37 registering with a large portion of the annular space in the cavity 28.

The shaft elements 38 on the male mold member 30 extend outwardly through apertures in the covers 34, 36, and seals 54 are provided between the cooperating surfaces of the covers 34, 36 and the male mold member 30 to prevent fluid from leaking from the annular spacing about the ends of the body portion 32 and preventing impurities from entering thereinto. The body portion 32 of the male mold member 30 has a chamber 40 therein and the shaft elements 38 have passages 42 communicating therewith for flow of heat exchange fluid therethrough.

A tubular jacket 44 extends about the mold 24 and is of greater internal diameter than the mold so as to provide an annular cavity 46. Seals 56 are provided between the ends of the jacket 44 and the flanges 26 so as to seal the ends of the cavity 46. An inlet tube 48 and an outlet tube 50 adjacent the ends of the jacket 44 provide for flow of heat exchange fluid through the cavity 46.

To permit air to escape a vent 59 is provided in the top cover 33. As diagrammatically illustrated in FIG. 3, synthetic plastic resin is fed by the pump 53 from the supply vessel 60 into the annular space through the supply line 62 which has a valve 64 therein. The supply vessel 60 has a detachable cover 66 for filling and cleaning. A line 68 from the vacuum pump 52 permits evacuation of air from the supply vessel 60 upon opening of the valve 70 and closing of the cover 66 of the supply vessel 60.

In the practice of the present invention utilizing the apparatus diagrammatically illustrated in FIG. 3, a male mold member 30 having the desired pattern of surface embossments or cavities 33 about its circumference such as shown in exaggerated size in FIG. 4 is cleaned and mounted in the mold 24. Generally, this mold member 30 will be metallic and have the pattern of embossments engraved, etched or otherwise formed in its surface. Desirably, the wall of the mold 24 defining the cylindrical aperture 28 therein has been treated with a primer to form a thin coating 69 thereon for facilitating adhesion thereto as shown in exaggerated thickness in FIG. 3. This may be accomplished by first flushing the mold 24 with the resin prior to introduction of the male mold member 30. By first applying a primer coating to the mold 24, a resin which will bond to the primer only may be used so as to eliminate any need for applying a release coating to the surface of the male mold member 30.

A volume of the synthetic plastic resin in the supply vessel 60 is placed under vacuum by the vacuum pump 52 through the line 68 by closing the cover 66 thereon and by opening the valve 70 so as to extract air from the body thereof. After removal of air from the resin the vacuum is discontinued by closing the valve 70. In this manner, a porosity-free material may be obtained. The pump 53 may then be used to convey resin from the vessel 60 through the line 62 into the annular space between the male mold member 30 and the mold 24 through the line 54 by opening the valve 64 and allowing air to escape through the vent 58. This stage shown in FIG. 4.

After filling the annular space in the mold 24, the valve 62 is closed, and windows (not shown) of synthetic plastic or glass may be provided in the mold 24 to observe proper filling. The cylindrical mold 24 is rotated several times about the male mold member 30 by turning the upper flange 26 in order to ensure proper distribution of the resin 71 and orientation in the direction of roll rotation.

The resin 71 is then cured by introducing a heated fluid into the cavity 46 of the jacket 44 from a suitable source (not shown) through the inlet tube 48. To expedite curing, the heated fluid is also introduced into the chamber 40 of the male mold member 30 through the passage 42 in the upper shaft element 38 by a coupling (not shown). The fluid is returned to the source by couplings (not shown) attached to the outlet tube 50 and lower shaft element 38.

After subjection to heat for the necessary time, the flow of heated fluid is discontinued and the mold assembly allowed to cool. Cold water is now introduced into the cavity 46 and chamber 40 from a suitable source (not shown) to cause the resin which has set and bonded to the wall of the mold 24 to shrink away from the male mold member 30. The top cover 34 is then removed and the male mold member 30 withdrawn from the cylindrical aperture 28. As seen in FIG. 5, the cured resin provides a female mold impression 72 having a multiplicity of generally semispherical embossments 74 (shown exaggerated in size) on its surface in a pattern conforming to the cavities 33 of the male mold member 30.

In making the resiliently faced embossing rolls of FIGS. 1 and 2, the surface of the female mold impression 72 of the mold 24 is desirably treated with a release agent and the surface of the body portion 12 of a support member 10 is treated with a primer. The support member 10 is mounted in the mold aperture 28 with its shaft elements 20 extending through the covers 34, 36 and the mold aperture 28 is sealed. As seen in FIG. 5, the diameter of the body portion 12 is less than the diameter of the female mold impression 72 so as to provide an annular spacing therebetween.

The process of filling the mold aperture 28 is repeated, preferably with a resin exhibiting little tendency to adhere to the cured resin of the mold impression 72. First, the body of liquid resin in the supply vessel 60 is evacuated. The resin 76 is then introduced into the cavity through the line 62 to fill the annular space between the mold impression 72 and body portion 12 as seen in FIG. 5. The mold 24 is rotated several times by the upper flange 26 to ensure proper distribution and orientation of the resin. Heated fluid from a suitable source (not shown) is circulated through the cavity 46 of the jacket by means of the inlet and outlet tubes 48, 50 and through the chamber 18 of the support member 10 by means of the passages 22 in the shaft elements 20.

After a time sufficient to set the resin 76, the flow of heated fluid is discontinued and chilled fluid is introduced to effect shrinkage of the resin which has bonded to the surface of the body portion 12 of the support member 10. The top cover 34 is removed and alcohol, air or some other fluid may be introduced into the cavity 28 through the feed aperture 37 to facilitate and ensure proper separation of the coating 14 from the female mold impression 72 by passage therebetween. The roll is then withdrawn from the mold aperture 28 and may be further cured or treated as desired to provide the roll illustrated in FIGS. 1 and 2.

As previously indicated, the procedure of the present invention can be utilized for producing various types of finishing rolls for synthetic plastic material in addition to the embossing roll illustrated in the attached drawings. Obviously, if the male mold member which is utilized to form the female impression is one having a multiplicity of protuberances upon its surface, then the resultant roll will have a relatively resilient coating with substantially identical protuberances thereon. This may then be utilized to produce sheet material having a multiplicity of cavities spaced about its surface in accordance with the pattern of protuberances upon the roll. It can be seen that the present invention can also be utilized for producing rolls with a highly polished, mirror-smooth, relatively resilient coating for use in preparing sheet material with a highly polished surface. Thus, although it is difficult to obtain a hollow tubular member which has a highly polished interior surface, a male mold having a highly polished exterior surface may be utilized to form a female impression with a highly polished surface. This in turn can be used to generate a roll with a highly polished resilient surface coating.

Various types of synthetic resins may be utilized for generating both the female mold impression and the resilient surface coating upon the roll including silicone rubbers, polyurethanes and synthetic rubbers such as polybutadienes and interpolymers of butadiene with other ethylenically unsaturated monomers such as styrene, acrylonitrile, acrylates and methacrylates, polyisoprenes, ethylenes/propylene terpolymers, etc. Generally, the resins should have a durometer of 50-100 on the "Shore A" scale, and preferably about 60-85. The resins which have proven to be particularly advantageous from the standpoint of durability, desired durometer, facility of molding and temperature resistance are the silicones. Exemplary of silicone compositions which have been employed are those manufactured by Dow-Corning and specifically that sold under the trademark SYLGARD 182 and those manufactured by General Electric Company and specifically those sold under the designations RTV 615 and RTV 630. The particular polymer and even the characteristics of a given polymer will vary with the desired application and durometer. The resin should be one which cures to a relatively nonporous surface and should possess a fairly high degree of solvent resistance. As will be pointed out hereinafter, resins which have a relatively high coefficient of thermal expansion are advantageous from the standpoint of ease of fabrication.

The time for curing or setting of the resin will vary with the particular resin selected, as will the temperature. Generally, these factors are readily available from the specifications of the particular manufacturer for the given product. Resins which cross-link should be allowed to thoroughly cure before use so as to avoid any deteriorating effect upon the surface of either the female mold impression or the synthetic resin coating upon the product roll.

It will be appreciated that a resin may be used for the female mold impression which is different from that employed for the product roll, and this may offer certain advantages in facilitating the nonadherence of the resin being cast against the female mold impression. Moreover, it is sometimes desirable to fabricate the thickness of the coating on the roll from two layers of different resins so as to obtain the overall properties in the coating. For example, the underlying layer may be relatively resilient and the overlying layer may be relatively rigid with the composite providing the desired degree of resiliency. In addition, the durometer of a particular resin may be increased through the use of fillers as is well known.

To ensure complete adhesion of the resin to either the wall of the mold defining the aperture or the surface of the support member depending upon the particular step involved, the surface of the underlying metal should be cleaned thoroughly to remove grease and dirt and desirably coated with a primer suitable for the particular resin employed. Primers have proven particularly advantageous with the silicone resins and the manufacturers thereof offer suitable primers for their several products.

The primers may be applied in any suitable manner. In application of the primer to the surface of the mold defining the aperture, the mold may be initially flushed with primer prior to introduction of the male mold member. Alternatively, the primer may be applied to the surface by brushing, rolling, spraying or the like, which techniques may also be utilized in conjunction with the treatment of the support member prior to insertion into the mold. However, the support member may also be rotated through a bath of the primer material. The thickness of the primer will vary with the effectiveness thereof and the recommendations of the individual manufacturer to obtain optimum benefits therefrom. In some instances, the primers may be precured depending upon the chemical composition thereof and the recommendations of the manufacturer.

The male mold may be removed from the female mold impression in several different ways. The most convenient technique involves cooling of the female mold impression to effect shrinkage thereof sufficiently to enable facile removal of the male mold. Alternatively, the mold into which the female mold impression is cast may be one which is fabricated from a plurality of sections held together in a manner which will permit the sections to be moved apart sufficiently to provide for expansion of the female mold impression within its elastic limits for purposes of removing the male mold. Still another technique involves the use of a female mold impression which is not bonded to the mold wall so that it may be removed together with the male mold member and then expanded in dimension by any suitable technique such as stretching by vacuum or swelling by use of suitable organic liquids. Where deep embossments are employed, it may be necessary to utilize these alternate techniques although the amount of relative shrinkage can be enhanced by increasing the thickness of the female mold impression upon the surface of the mold.

Similarly, the male mold impression formed upon the support member may be separated from the female mold impression by use of thermal contraction or shrinkage of the resin. This shrinkage will primarily be that of the female mold impression although the shrinkage of the male mold impression will cooperate therewith to some degree depending upon its thickness since generally the female mole impression is of considerably greater thickness than that of the male mold impression formed upon the support member. Where the mold is fabricated from a plurality of segments, the female mold impression may again be expanded to permit removal of the support member and male mold impression. In addition, the female mold impression may be removed from the mold together with the support member and male mold impression formed thereon and thereafter removed from the male mold impression by being expanded in dimension through the use of vacuum or by swelling, etc.

In order to obtain optimum surface control, the heat cycle for the resin is extremely important. Initially, the resin should be heated to a temperature somewhat below that at which rapid setting will occur so as to produce substantially all the expansions of the resin while it is still fluid, thus allowing the fluid resin to displace within the mold cavity without applying great pressures to the surfaces of the mold and roll and avoiding flow of the solidified resin. Thereafter, the temperature of the resin is increased to produce expansion of the solidified resin and to offset the shrinkage which occurs during solidification or setting thereof. The temperatures and times will vary with the particular resins employed as is well known in the art, it being the intention to produce the predominant portion of the expansion of the resin before substantial solidification and to offset shrinkage during setting by increase in temperature to effect further expansion of the resin. Thereafter, the resin may be held at the same or a somewhat higher temperature for curing in the assembly, or the parts may be separated and a much higher temperature imparted thereto to effect curing in a shorter period of time. It will be appreciated that excessive thermal expansion while the parts are in the mold assembly would tend to produce great pressures with attendant distortion and flow of the solidified resin so that excessively elevated temperatures after solidification and while in assembly should not be employed. As indicated herein, the surface of the female mold impression should be inert to the liquid resin for the male mold impression to prevent bonding therebetween. This is conveniently effected by the use of a coating of a release agent on the female mold impression, or by selection of resins for the two mold impressions which will not adhere to each other, and by the combination thereof.

In accordance with one embodiment of the present invention, the male mold impression is not bonded to the support member at the time of its casting but is subsequently assembled to the same support member or another support member in a manner so as to permit distortion of a pattern of embossments formed thereon. In this particular technique, it is desirable to provide at the top and bottom of the mold cavity in the female mold impression annular support elements which are coated with a primer or otherwise treated so as to facilitate bonding of the resin of the male mold impression thereto. In this manner, the annular elements provide means to facilitate subsequent handling of the male mold impression and mounting thereof in other apparatus. With this technique, the support member and the male mold impression with its annular elements are removed from the mold. The male mold impression may then be stretched axially over the same or a different support member to increase the axial spacing between embossments and produce distortion of the pattern thereof. It will also be appreciated that this male mold impression may be stretched circumferentially about a support member of greater diameter to produce an increase in the circumferential spacing of the embossments with a resultant distortion of the pattern. In still another technique, one or both ends of the male mold impression may be twisted circumferentially about the support member so as to produce a twist in the pattern of embossments. Thus, a single female mold impression may be utilized to generate a wide variety of patterns of the embossments upon the support members.

The thickness of the coating on the support member to provide the embossing roll should be sufficient to provide the desired degree of resiliency but not excessive so as to permit reasonably efficient heat transfer therethrough. Generally, the thickness of the coating for the male mold impression will be on the order of one-sixteenth to one-half inch and preferably on the order to three thirty-seconds to one-fourth inch.

In order to provide sufficient thickness in the female mold impression for purposes of facilitating separation by shrinkage, the resin coating upon the mold should be on the order of one-fourth to 1-½ inches and preferably about three-eighths to 1 inch. Although greater thicknesses may be employed, little advantage is to be gained therefrom and some problems may be encountered in casting thicker layers. Nevertheless, layers in excess of one inch in thickness may be employed for some applications, particularly, when the diameter of the mold aperture is relatively large, i.e., greater than about 10 inches.

In order to obtain a homogeneous coating which is free from defects, the resin should be screened to remove occluded dirt and occluded particles and should also be subjected to vacuum, preferably with agitation or other means for exposing different portions thereof, in order to remove air, other gases and volatile components. A vacuum on the order of one to three millimeters mercury for 15 minutes to 2 hours is most desirably employed.

Since the synthetic plastic resin is highly viscous, flow in the relatively narrow spacing of the mold cavity will often be relatively nonuniform and produce flow lines in the coating of the viscous resin formed upon the mold or the support member, as the case may be. Such flow lines would produce highly undesirable defects in the surface of the sheet material embossed with the resultant roll body. Accordingly, it has been found extremely advantageous to rotate the original male mold member or roll and the mold relative to each other to eliminate such flow lines and orient the resin of the female mold impression in the direction of roll rotation. Similarly, the support member subsequently introduced into the female mold impression and the mold together with the female mold impression are rotated relative to each other to orient the resin in the coating upon the support member in the direction of roll rotation.

The procedure of the present invention has proven particularly beneficial in making embossing rolls with relatively minute formations about the surface thereof. Exemplary of the efficacy of the method of the present invention is its utilization to provide embossing rolls of the type necessary to provide the optically active sheet material of United States Letters Pat. No. 3,357,772, granted Dec. 12, 1967, wherein a multiplicity of minute lenslike embossments upon one surface phase in and out of axial alignment with a multiplicity of reflective embossments on the other surface of the sheet material.

Illustrative of the efficacy of the present invention is the following specific example wherein an embossing roll was prepared.

EXAMPLE 1

A mold assembly generally similar to that illustrated in FIG. 1 was utilized having a mold cavity having an axial length of 68 inches and a diameter of about 7 inches. The male mold member in this particular instance was an engraved steel roll which has a hexagonal pattern of cavities formed therein, the cavities being generally spheroidal with a diameter of about 0.010 inches and a depth of about 0.006 inches. The roll body had an axial length of 66 inches and an outside diameter of about 6 inches. After thoroughly cleaning the roll, a relatively thin coating of a wax release agent was applied to the surface thereof. Prior to insertion of the roll into the mold cavity, the wall of the mold was sandblasted, cleaned with solvent and then primed with a coating of a silicone primer sold by Dow-Corning under the designation SYLGARD.

A volume of a silicone resin sold by General Electric Company under the designation RTV-630 was placed within a supply vessel together with 10 per cent by weight, based upon the resin, of a curing agent therefor sold by General Electric Company under the designation "630 B." This mixture was subjected to a vacuum of 2 torrs for a period of about 1 hour to remove gas and volatile components therefrom.

Thereafter, the vacuum was discontinued and air pressure was applied to the supply vessel to transport the relatively viscous resin from the supply vessel into the annular spacing between the roll and the wall of the mold. Sufficient resin was introduced so as to fill the annular cavity substantially completely but an air space of about 1½ inches was left at the top of the mold. The mold was then rotated several times relative to the roll to effect orientation of the coating circumferentially about the roll and to eliminate any flow lines therein while achieving homogeneity through the resin.

Heat exchange fluid was then supplied to the jacket about the mold and to the chamber in the roll at a temperature of 110° F. for about 15 minutes and then the temperature of the heat exchange medium was raised to 145° F. over a period of about 20 minutes and maintained thereat for an additional 45 minutes. During this period the resin in the mold cavity expanded while still in liquid form so as to completely fill the initial air space at the top of the cavity and the resin then solidified. As solidification produced contraction or shrinkage of the volume of the resin, the temperature of the heat exchange fluid was elevated to 150° F. to produce compensatory thermal expansion of the resin and held at this temperature for 8 hours during which complete solidification and initial curing of the resin occurred.

The temperature of the heat exchange fluid was then reduced to about 45° F. and flow was continued for a period of about 30 minutes to effect thermal contraction or shrinkage of the resin forming the female mold impression on the surface of the mold. The top cover for the mold assembly was then removed and 250 cc. of denatured alcohol were introduced into the annular space between the female mold impression and the surface of the male roll to facilitate separation. The alcohol penetrated throughout the depth of the mold assembly and acted as a lubricant and release agent, and the roll was drawn readily outwardly from the female mold impression.

A coating of a high temperature wax release agent was then applied to the surface of the female mold impression. A support member having a cylindrical body portion of 5-¾ inches outside diameter and 66 inches axial length and having shafts extending outwardly from the ends of the body portion was cleaned and a primer (sold by Dow-Corning under the designation SYLGARD) was applied to the surface of the body portion. The support member was centered within the cavity of the female mold impression and the top cover secured in position. A volume of silicone resin sold by General Electric Company under the designation "RTV–630" containing 10 per cent by weight, based upon the resin, of a curing agent sold by General Electric Company under the designation "630 B" was placed within the supply vessel and subjected to a vacuum of about 2 torrs for a period of about 1 hour. The resin was then placed under positive air pressure of approximately 27 p.s.i.g. and introduced into the annular cavity between the support member and the female mold impression in an amount sufficient to fill substantially the entire cavity except for about 1-½ inches at the top thereof.

The support member and the mold were rotated relative to each other several times to effect orientation of the viscous resin in the direction of roll rotation and to eliminate axial flow lines. Heat exchange fluid was introduced into the mold jacket and into the chamber of the support member at a temperature of about 110° F. for a period of about 10 minutes. The heat exchange medium supplied to the mold jacket was elevated to about 145° F. and held at temperature for about 45 minutes while the flow of the heat exchange medium to the support member was discontinued. As a result, the heat exchange medium supplied to the mold jacket gradually elevated the temperature of the female mold impression and then slowly elevated the temperature of the female mold impression and then slowly elevated the temperature of the liquid resin and the male support member. This gradual elevation of the temperature of the liquid resin produced the gradual thermal expansion of the female mold impression and also the substantial expansion of the liquid resin.

The temperature of the heat exchange fluid supplied to the mold jacket was then raised to 150° F. and then flow of heat exchange fluid to the support member was started again to elevate the temperature thereof to 150° F. As a result, the shrinkage of the liquid resin occuring by reason of solidification was substantially offset by thermal expansion thereof so as to maintain the surface of the solidifying resin forming the male mold impression in close surface contact with the surface of the female mold impression. This is extremely important for purposes of obtaining optimum reproducibility of pattern. The flow of heat exchange medium at 150° F. was continued for a period of about 8 hours to effect complete curing of the resin on the surface of the support member.

Thereafter, heat exchange fluid at a temperature of about 45° F. was introduced into the mold cavity and into the support member for about 45 minutes to produce chilling thereof and thermal contraction of both the female mold impression and the male mold impression. The cover was removed and denatured alcohol was introduced between the female mold impression and the male mold impression to facilitate separation thereof. The support member was then withdrawn from the female mold impression and inspected under magnification. It was determined that the surface thereof had a multiplicity of generally spheroidal cavities substantially identical in pattern and spacing to that of the original engraved roll.

The roll thus produced was assembled in a roll stand in cooperation with the original male mold member to define a roll nip therebetween. Heat exchange fluid was introduced into the rolls to effect heat control, and flexible polyvinyl chloride sheeting issuing from an extruder was passed into the nip therebetween the rolls applying sufficient pressure thereto so as to emboss both surfaces thereof. The resultant sheet material was found upon inspection to have a multiplicity of embossments formed upon the surfaces thereof complementary to the pattern of cavities in the embossing rolls and substantially uniform across the entire width thereof. This sheet material displayed interesting visual patterns and is the subject of United State Letters Pat. No. 3,357,772, granted Dec. 12, 1967.

Thus, it can be seen that the present invention provides a novel and highly effective method for producing rolls having a relatively resilient surface of the desired surface characteristics for use in finishing the surface of synthetic thermoplastic sheet material. The method is relatively economical and adaptable to providing rolls with a relatively wide variety of finishes. The resiliently faced rolls of the present invention may be used in pairs or they my be used in combination with a steel or like roll. By varying the resin in the coating or using two-layer coatings, the durometer or resiliency of the surface coating upon the roll may be varied to suit the needs of the particular application.

We claim:

1. In the method of making rolls for producing a closely controlled surface finish upon synthetic thermoplastic sheet material, the steps comprising: providing a mold having an aperture therein; supporting coaxially in said aperture a generally cylindrical male mold member having a nonthermoplastic circumferential surface portion of essentially homogenous composition and providing a seamless peripheral surface with a multiplicity of formations thereabout for producing a complimentary embossed surface on sheet material pressed thereagainst, said male mold member being of lesser diameter than the wall of said mold defining said aperture so as to provide a space therebetween; introducing a fluid synthetic plastic resin into said space between said male mold member and the wall of said mold providing said aperture; subjecting said synthetic plastic resin to conditions including an elevated temperature sufficient to set said synthetic plastic resin and bond it to said wall of said mold, said synthetic plastic resin upon setting being relatively durable and closely conforming to the surface of said male mold member to provide an impression thereof; removing said male mold member from the mold synthetic plastic resin impression which provides a generally cylindrical seamless female mold impression bonded to said wall of said mold, said removal being without disassembly of said mold and by contraction of the resin of said impression by cooling from said elevated temperature to facilitate separation of said male mold member therefrom; positioning a support member coaxially in the cavity defined by said female mold impression, said support member being of lesser width than the inside diameter of said impression so as to provide a space therebetween; introducing a fluid synthetic plastic resin into said space to fill said space the surface of said female mold impression being essentially inert to said fluid resin to prevent bonding therebetween, said fluid providing a relatively durable and resilient material upon setting thereof; subjecting said synthetic plastic resin to conditions including an elevated temperature sufficient to set said synthetic plastic resin and form a cylindrical layer about said supporting member, said synthetic plastic resin conforming closely to the surface of said female mold impression upon setting to provide a male impression thereof with embossing formation spaced about the surface of said layer, said resin of said male impression upon setting being essentially free from bonding to said female mold impression; cooling said impression and said layer upon said support member from said elevated temperature to effect shrinkage of the resins thereof and to facilitate separation therebetween and removing said support member and cylindrical layer thereon from said mold and female impression without disassembling said mold, said cylindrical layer in assembly about a support member providing a cylindrical roll body having a relatively resilient seamless surface conforming substantially to that of said male mold member with embossing formation spaced about the surface of said layer.

2. The method of claim 1 wherein said synthetic plastic resin for at least the layer upon said support member comprises a silicone resin.

3. The method of claim 1 wherein a fluid is introduced between said layer upon said support member and said female mold impression to facilitate separation thereof.

4. The method of claim 1 wherein said resin of said female mold impression is bonded to said mold and wherein said resin layer is bonded to said support member, both being bonded upon initial setting of the resin.

5. The method of claim 1 wherein the surface of the mold defining the aperture is initially treated with a primer to facilitate adhesion thereto and wherein the support member is initially treated with a primer to facilitate adherence of the layer thereto.

6. The method of claim 1 wherein a release agent is initially applied to the surface of the female mold impression to prevent adherence of the subsequently introduced synthetic plastic resin thereto.

7. The method of claim 1 wherein the fluid synthetic plastic resin is initially subjected to a vacuum to remove air and other gas therefrom.

8. The method of claim 1 wherein the resin introduced into the space between the male mold member and wall of the mold is initially heated to a temperature somewhat below that at which setting will rapidly occur to produce expansion thereof while said resin is liquid and is thereafter heated to effect setting thereof with the change in temperature substantially compensating for any shrinkage of the resin occuring during setting.

9. The method claim 1 wherein said formations on said male member are comprised of a multiplicity of substantially spheroidal cavities about its surface to provide generally speroidal embossments upon synthetic plastic sheet material pressed thereagainst.

10. The method of claim 1 wherein said mold is a cylindrical tubular member having a unitary circumferential wall.

11. In the method of making seamless rolls for producing an embossed surface upon synthetic thermoplastic sheet material, the steps comprising: providing a cylindrical tubular mold having a cylindrical mold aperture therein defined by a unitary circumferential wall; supporting coaxially in said mold aperture a generally cylindrical male mold member having a nonthermoplastic circumferential surface portion of essentially homogeneous composition and providing a seamless peripheral surface with a multiplicity of cavities about its surface to provide an embossed surface upon synthetic plastic sheet material, said male mold member being of lesser diameter than the wall of said mold defining said aperture so as to provide an annular space therebetween; introducing a fluid synthetic plastic resin into said space between said male mold member and the wall of said mold providing said aperture; subjecting said synthetic plastic resin to conditions including an elevated temperature sufficient to set said synthetic plastic resin and bond said synthetic plastic resin to the wall of said mold defining said aperture, said synthetic plastic resin upon setting being relatively durable and closely conforming to the surface of said male mold member to provide an impression thereof; chilling said synthetic plastic resin to produce shrinkage thereof from the surface of said male mold member; removing said male mold member from the bonded mold and synthetic plastic resin impression which provide a generally cylindrical female mold impression with a multiplicity of embossments therein, said removal being without disassembly of said mold and by contraction of the resin of said impression by cooling from said elevated temperature to facilitate separation of said male mold member therefrom; positioning a generally cylindrical support member coaxially in the cavity defined by said female mold impression, said support member being of lesser width than the inside diameter of said impression so as to provide an annular space therebetween; introducing a fluid synthetic plastic resin into said space to fill said space, the surface of said female mold impression being essentially inert to said fluid resin to prevent bonding therebetween, said fluid resin providing a relatively durable and resilient material upon setting thereof; subjecting said synthetic plastic resin to conditions including an elevated temperature sufficient to set said synthetic plastic resin and produce bonding thereof to said support member as a layer thereon, said synthetic plastic resin conforming closely to the surface of said female mold impression upon setting to provide a male impression thereof with embossing formations spaced about the surface of said layer, said resin of said male impression upon setting being essentially free from bonding to said female mold impression; chilling said synthetic plastic resin from said elevated temperature to produce shrinkage of said male impression and said female mold impression to permit separation thereof and without disassembling said tubular mold; and removing said support member and bonded layer thereon from said mold and female impression, the assembly thereof forming a cylindrical roll body having a relatively resilient surface with a multiplicity of cavities about its surface conforming substantially to that of said male mold member and with embossing formation spaced about the surface of said layer.

12. The method of claim 11 wherein said synthetic plastic resin for at least the layer upon said support member comprises a silicone resin.

13. The method of claim 11 wherein the resin introduced into the space between the male mold member and wall of the mold is initially heated to a temperature somewhat below that at which setting will occur to produce expansion thereof while said resin is liquid and is thereafter heated to effect setting thereof with the change in temperature substantially compensating for any shrinkage of the resin occuring during setting.

* * * * *